(12) United States Patent
Wunker et al.

(10) Patent No.: US 8,027,950 B1
(45) Date of Patent: Sep. 27, 2011

(54) ELECTRONIC FILE CREATION AND MANAGEMENT SYSTEMS AND METHODS

(75) Inventors: Barry P. Wunker, Gillette, WY (US);
Donald C Wind, Dallas, TX (US);
Michelle L Shea, Big Lake, MN (US);
Gracie Lauffer, Watauga, TX (US)

(73) Assignee: BNSF Railway Company, Fort Worth, TX (US)

( * ) Notice: Subject to any disclaimer, the term of this patent is extended or adjusted under 35 U.S.C. 154(b) by 57 days.

(21) Appl. No.: 12/802,961

(22) Filed: Jun. 17, 2010

Related U.S. Application Data

(63) Continuation of application No. 11/977,975, filed on Oct. 26, 2007, now Pat. No. 7,774,306.

(60) Provisional application No. 60/855,086, filed on Oct. 27, 2006.

(51) Int. Cl.
*G06F 7/00* (2006.01)
*G06F 17/00* (2006.01)

(52) U.S. Cl. .................. 707/609; 707/758; 707/822

(58) Field of Classification Search .................. 707/609, 707/758, 821, 822, 999.01; 715/205, 810
See application file for complete search history.

(56) References Cited

U.S. PATENT DOCUMENTS

| | | | | |
|---|---|---|---|---|
| 6,009,442 A * | 12/1999 | Chen et al. | ..................... | 715/205 |
| 6,253,236 B1 * | 6/2001 | Troxel et al. | .................. | 709/217 |
| 2003/0046114 A1 * | 3/2003 | Davies et al. | ..................... | 705/3 |
| 2003/0052925 A1 * | 3/2003 | Daimon et al. | ................ | 345/810 |
| 2003/0220879 A1 * | 11/2003 | Gaughan et al. | ................ | 705/51 |
| 2004/0128186 A1 * | 7/2004 | Breslin et al. | .................. | 705/10 |
| 2005/0114356 A1 * | 5/2005 | Bhatti | ........................ | 707/100 |
| 2005/0187937 A1 * | 8/2005 | Kawabe et al. | ................... | 707/9 |
| 2005/0216295 A1 * | 9/2005 | Abrahamsohn | .................. | 705/1 |
| 2006/0100912 A1 * | 5/2006 | Kumar et al. | ..................... | 705/4 |
| 2007/0016514 A1 * | 1/2007 | Al-Abdulqader et al. | ...... | 705/37 |
| 2008/0034006 A1 * | 2/2008 | Lee | ............................. | 707/200 |

\* cited by examiner

*Primary Examiner* — Phong Nguyen
(74) *Attorney, Agent, or Firm* — Thompson & Knight LLP; James J. Murphy

(57) ABSTRACT

A method of file management in an electronic processing system includes defining in the electronic system an electronic file of a selected file type and at least one electronic sub-folder within the electronic file for storing information of a corresponding information type. Roles are defined in the electronic processing system for participants creating and utilizing the electronic file, including a role for an information collector. The information collector is electronically tasked to collect information of the information type, which is uploaded and selectively stored in the sub-folder in the electronic file. Selected participants are allowed to access the electronic file as defined by the corresponding role.

13 Claims, 22 Drawing Sheets

(Sheet 1)

(Sheet 2)

(Sheet 3)

(Sheet 4)

(Sheet 1)

(Sheet 2)

(Sheet 3)

(Sheet 4)

(Sheet 5)

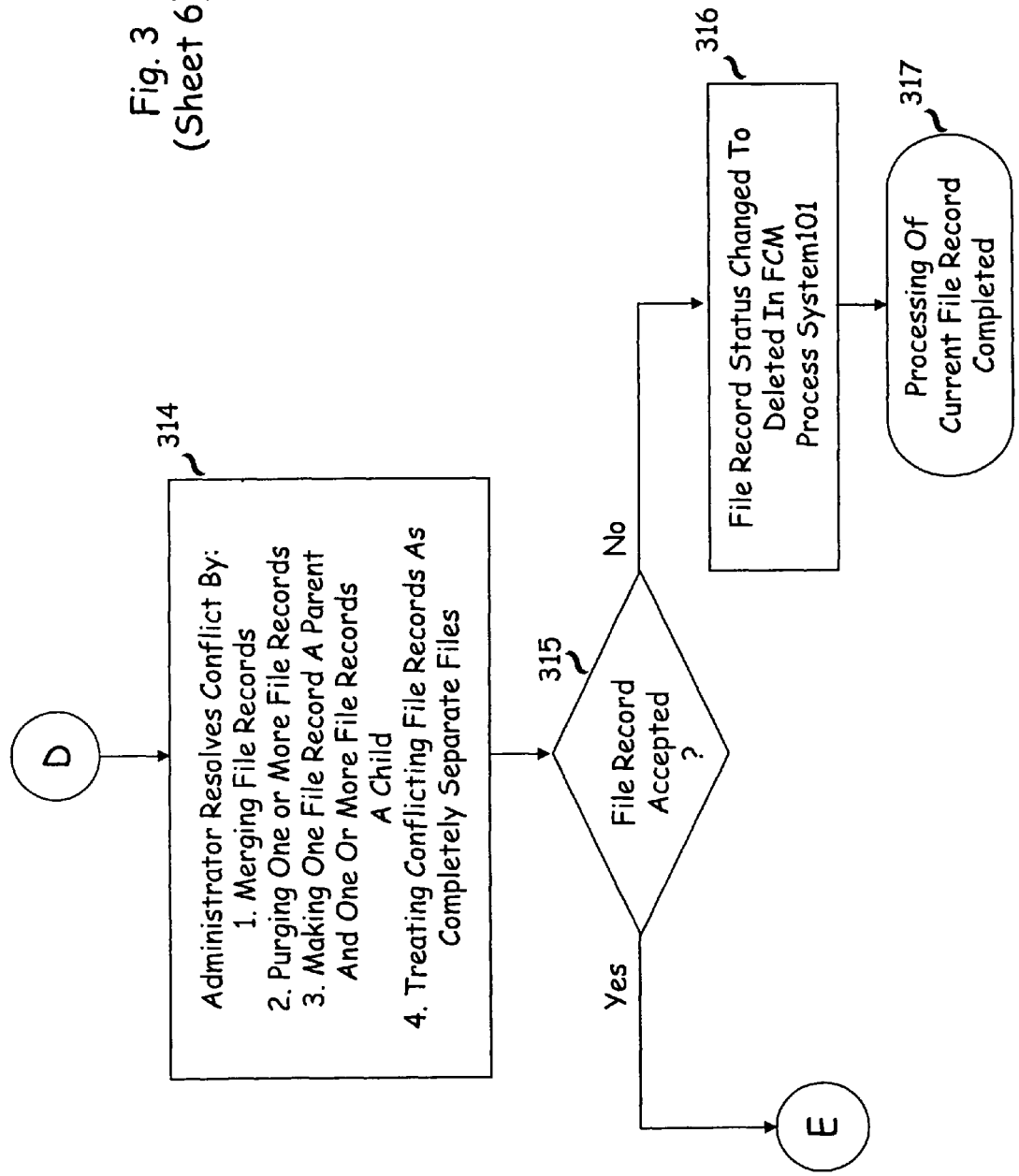

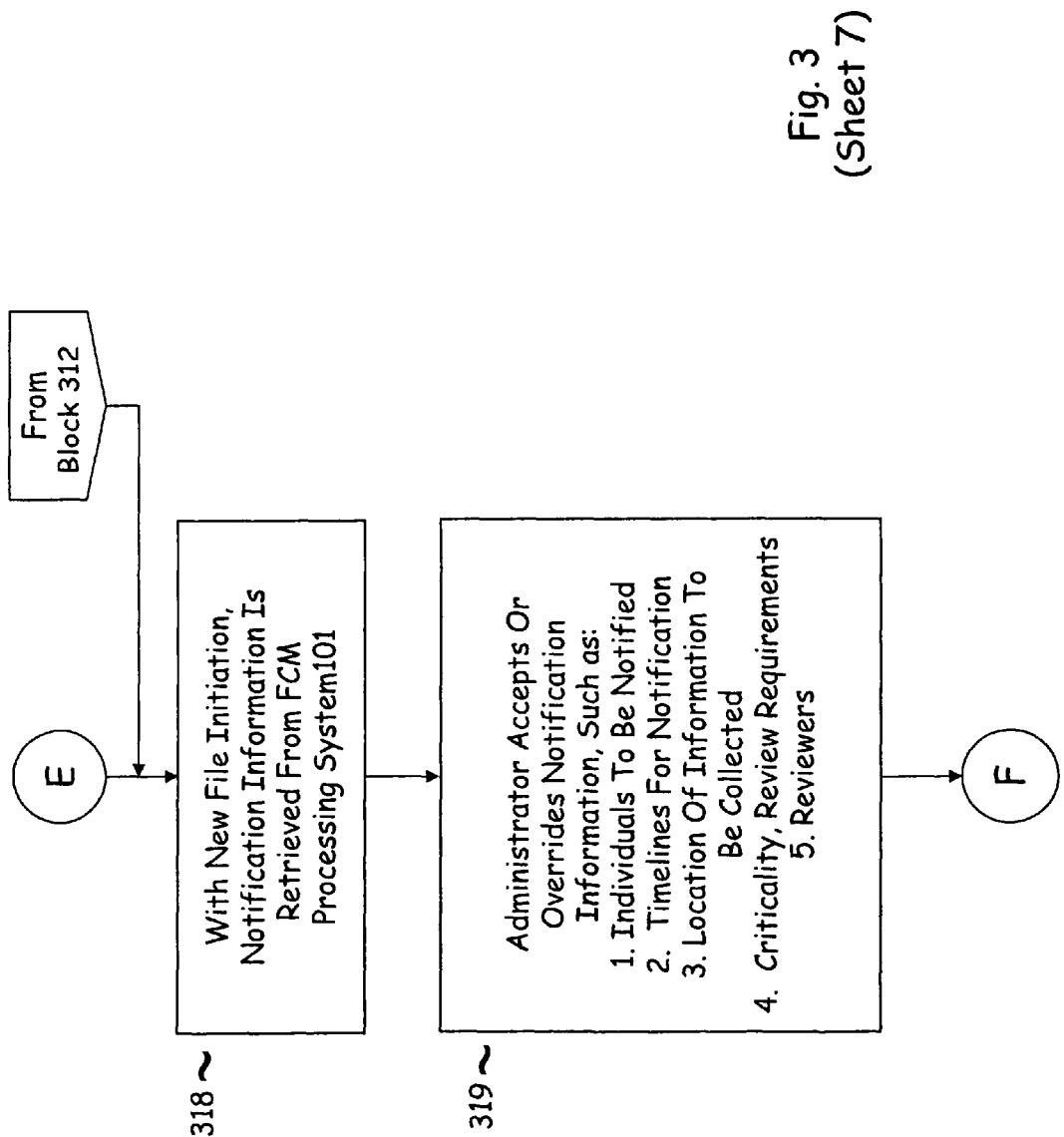

(Sheet 8)

(Sheet 9)

(Sheet 10)

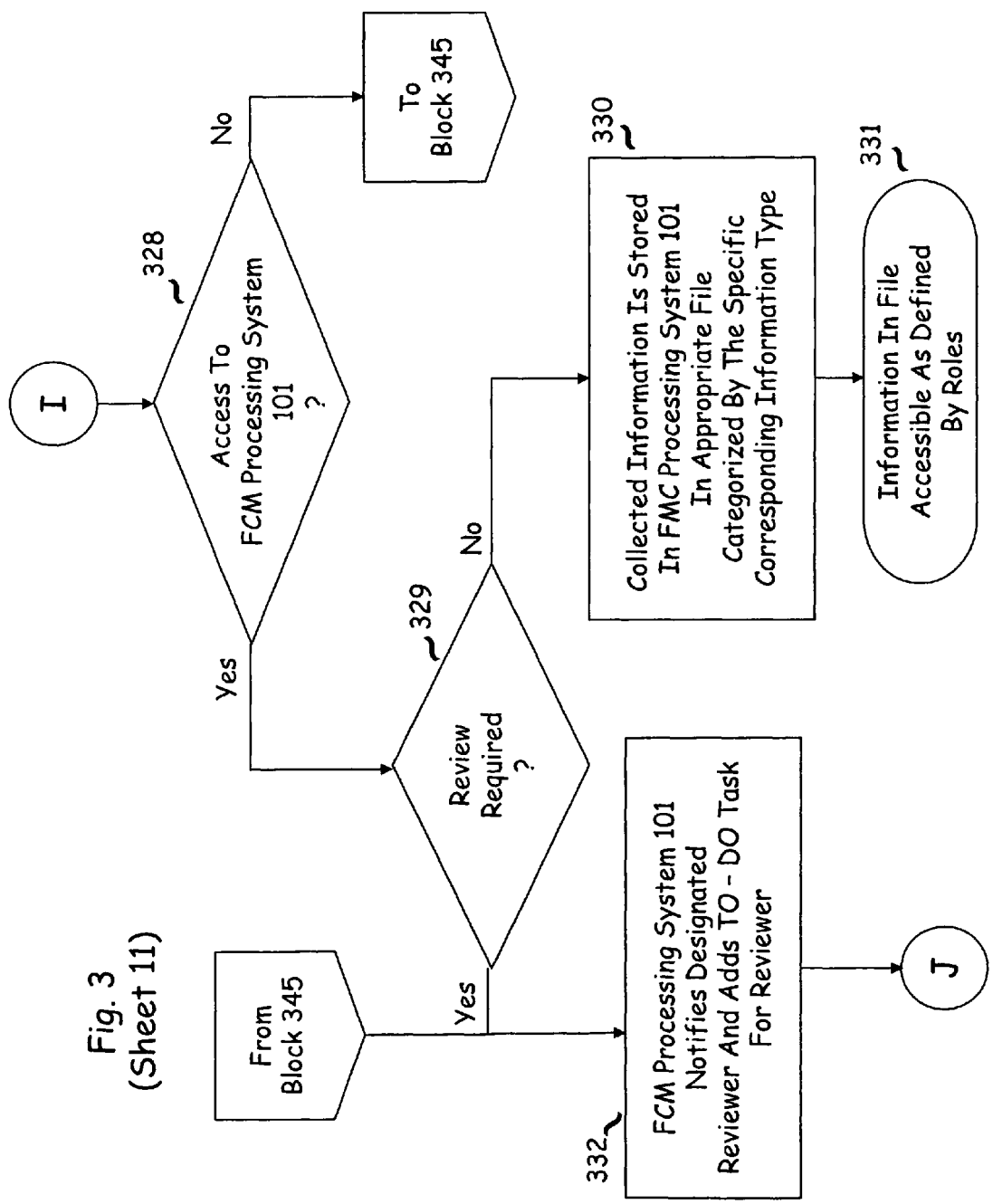

(Sheet 12)

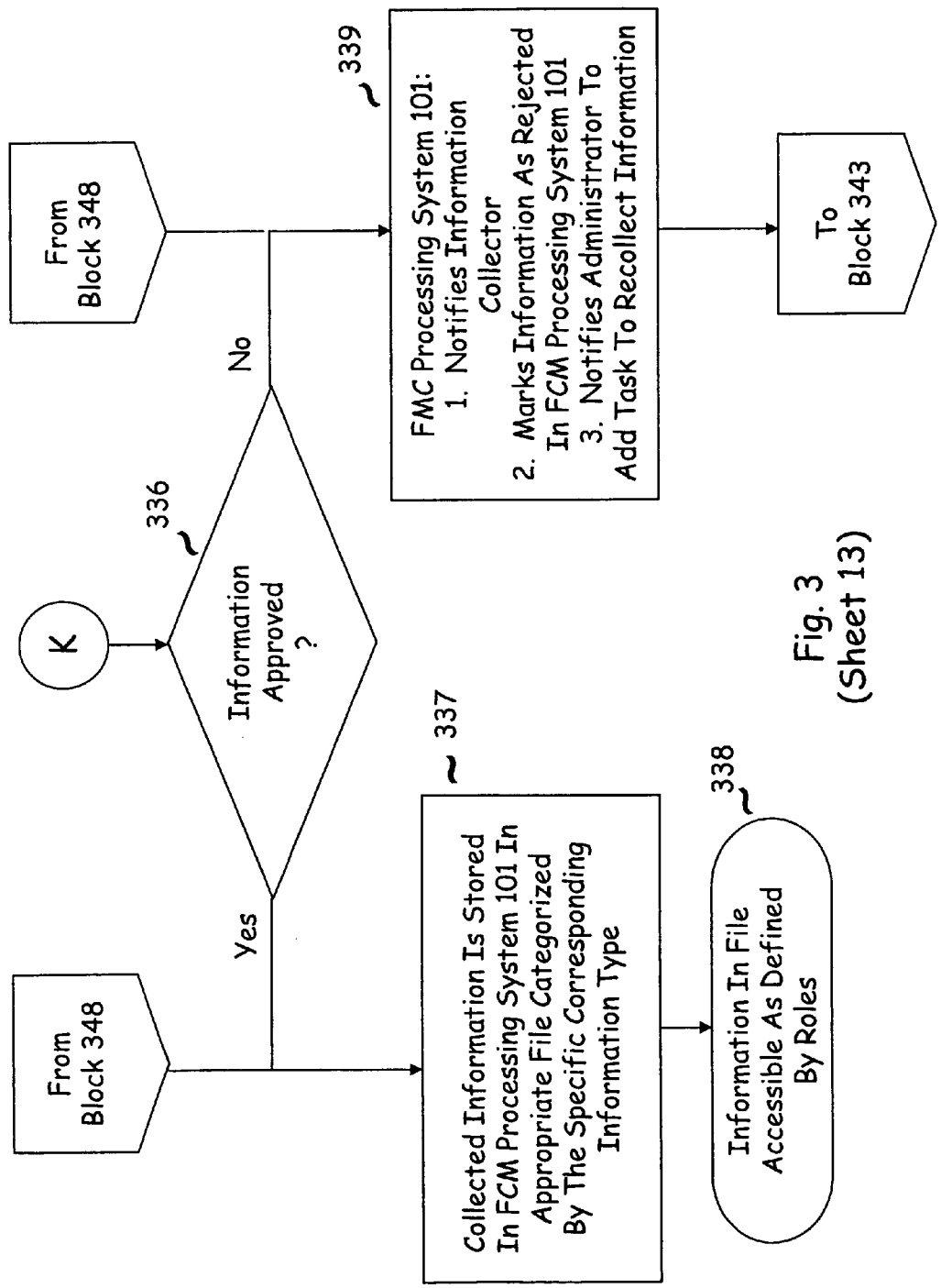
Fig. 3 (Sheet 13)

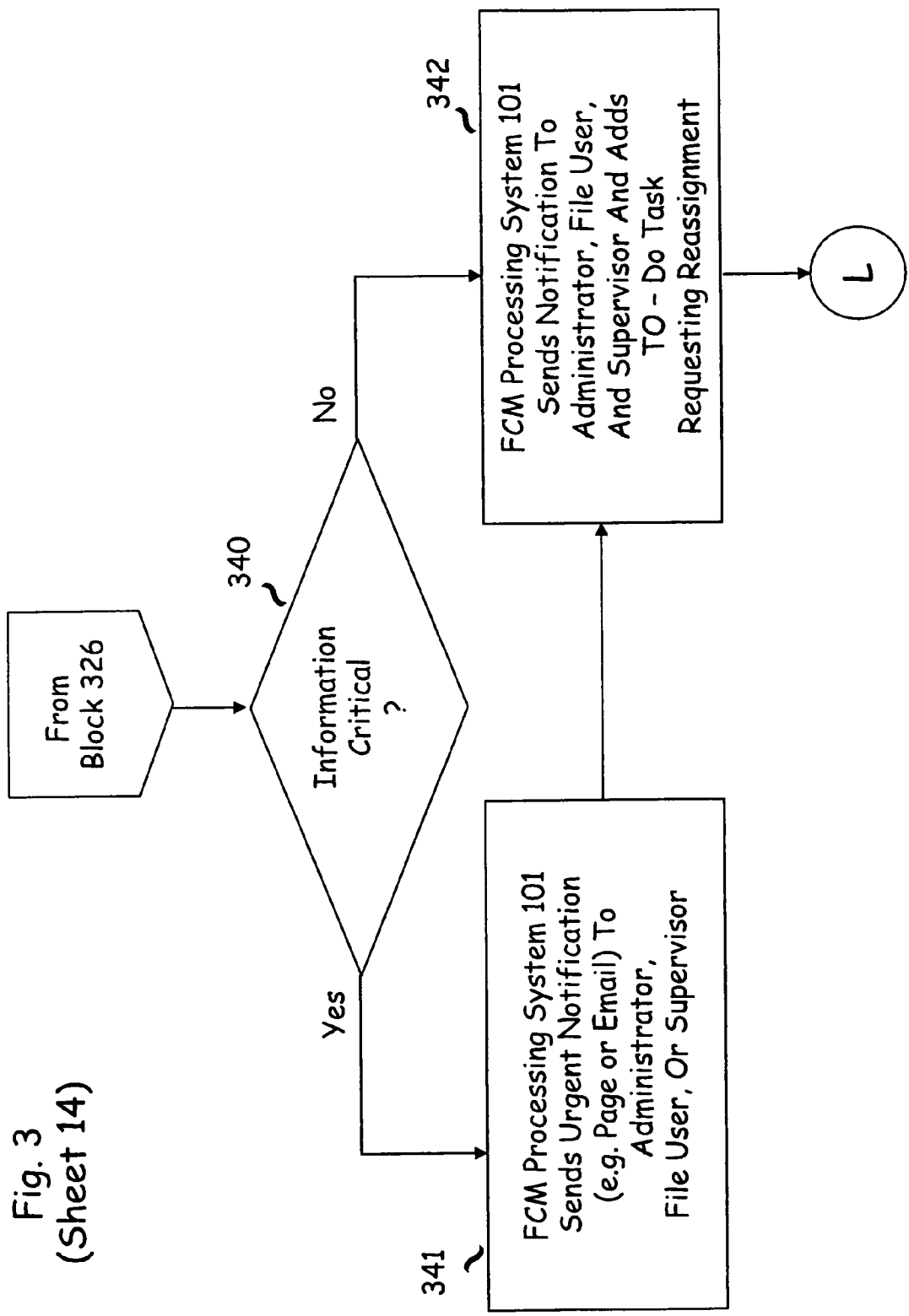
Fig. 3 (Sheet 14)

(Sheet 15)

(Sheet 16)

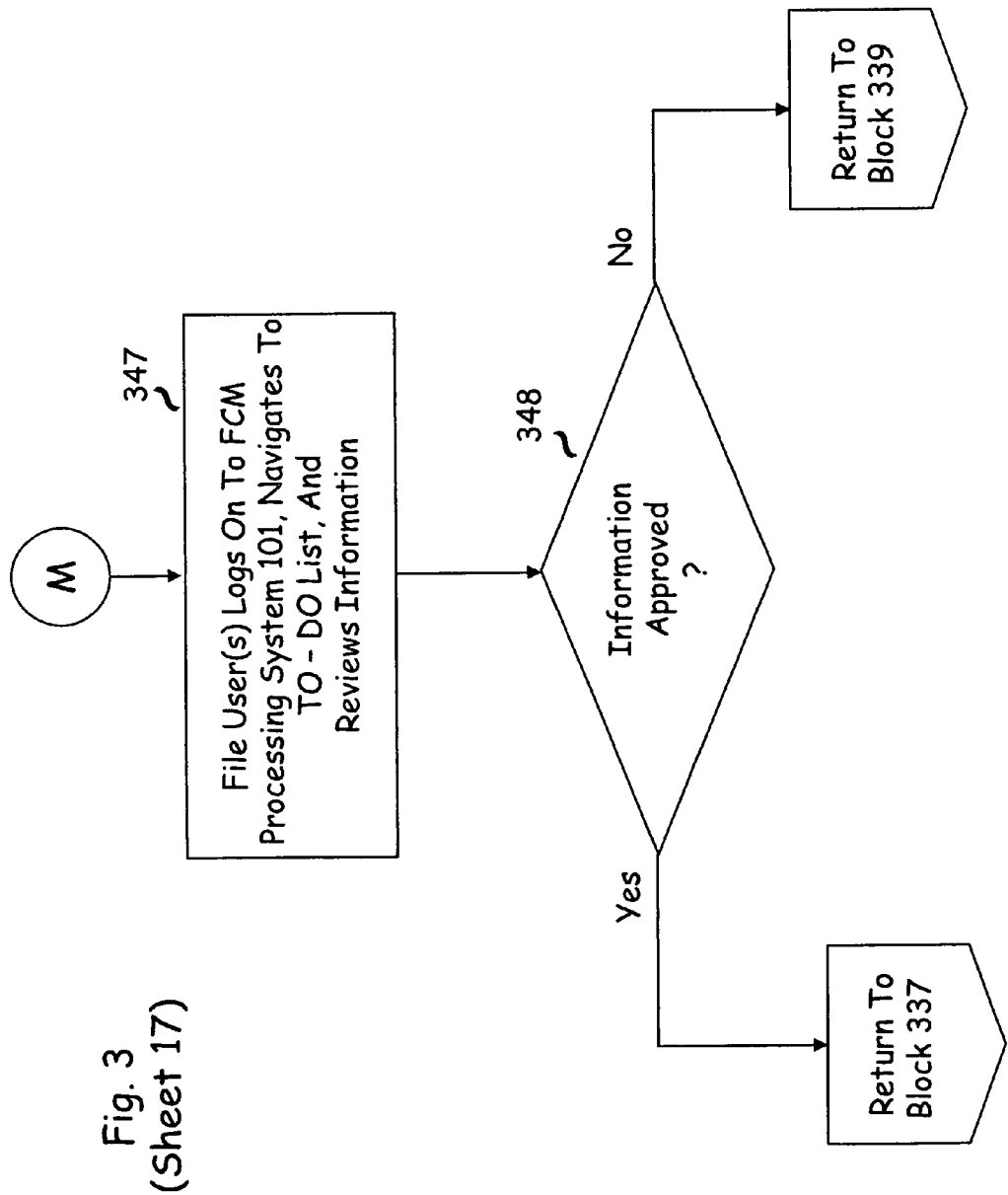

ELECTRONIC FILE CREATION AND MANAGEMENT SYSTEMS AND METHODS

CROSS-REFERENCE TO RELATED APPLICATION

The present application is a continuation of U.S. patent application Ser. No. 11/977,975, filed Oct. 26, 2007 now U.S. Pat. No. 7,774,306, which claims the benefit of U.S. Provisional Patent Application Ser. No. 60/855,086, filed Oct. 27, 2006.

FIELD OF INVENTION

The present invention relates in general to electronic document management techniques, and in particular to electronic file creation and management systems and methods.

BACKGROUND OF INVENTION

While hard-form documentation may never completely disappear, more and more businesses are relying on electronic-form documentation to improve the efficiency of their enterprises. Electronic documentation, which includes text documents, audio, video, and machine generated information, is generally easier to create, store, and exchange, in view of traditional hard form documents (e.g. paper, audio and video tapes and disks, and the like). This is particularly true as electronic information management technologies continue to improve.

Notwithstanding all advantages of electronic-form documents, the management of electronic form documentation presents a new set of challenges, for both large and small business enterprises. Among other things, the collected information still must be organized to allow efficient archiving and access. Additionally, managers must ensure that the necessary information, particularly time-critical information, is uploaded and made available for use in a timely fashion. Finally, a manager must be able to restrict access to sensitive company information to only those requiring such access to perform their assigned jobs.

SUMMARY OF INVENTION

The principles of the present invention are embodied in electronic file creation and management systems and methods. According to one particular embodiment, a method of file management in an electronic processing system is disclosed, which includes defining in the electronic system an electronic file of a selected file type and at least one electronic sub-folder within the electronic file for storing information of a corresponding information type. Roles are defined in the electronic processing system for participants creating and utilizing the electronic file, including a role for an information collector. The information collector is electronically tasked to collect information of the information type, which is uploaded and selectively stored in the sub-folder in the electronic file. Selected participants are allowed to access the electronic file as defined by the corresponding role.

The embodiments of the principles of the present invention realize substantial advantages over the prior art. Among other things, an electronic file can be created for a given purpose and the appropriate information collected by the appropriate personnel. The collected information can then be organized within the file by information type for efficient archiving and access. The inventive principles also provide for the review of uploaded information, such that information that does not meet the requirements of the information users can promptly be recollected. Finally, automatic notification systems are provided to insure that information required for a given file, particularly time-critical information, is collected and uploaded to the electronic file in a timely manner.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
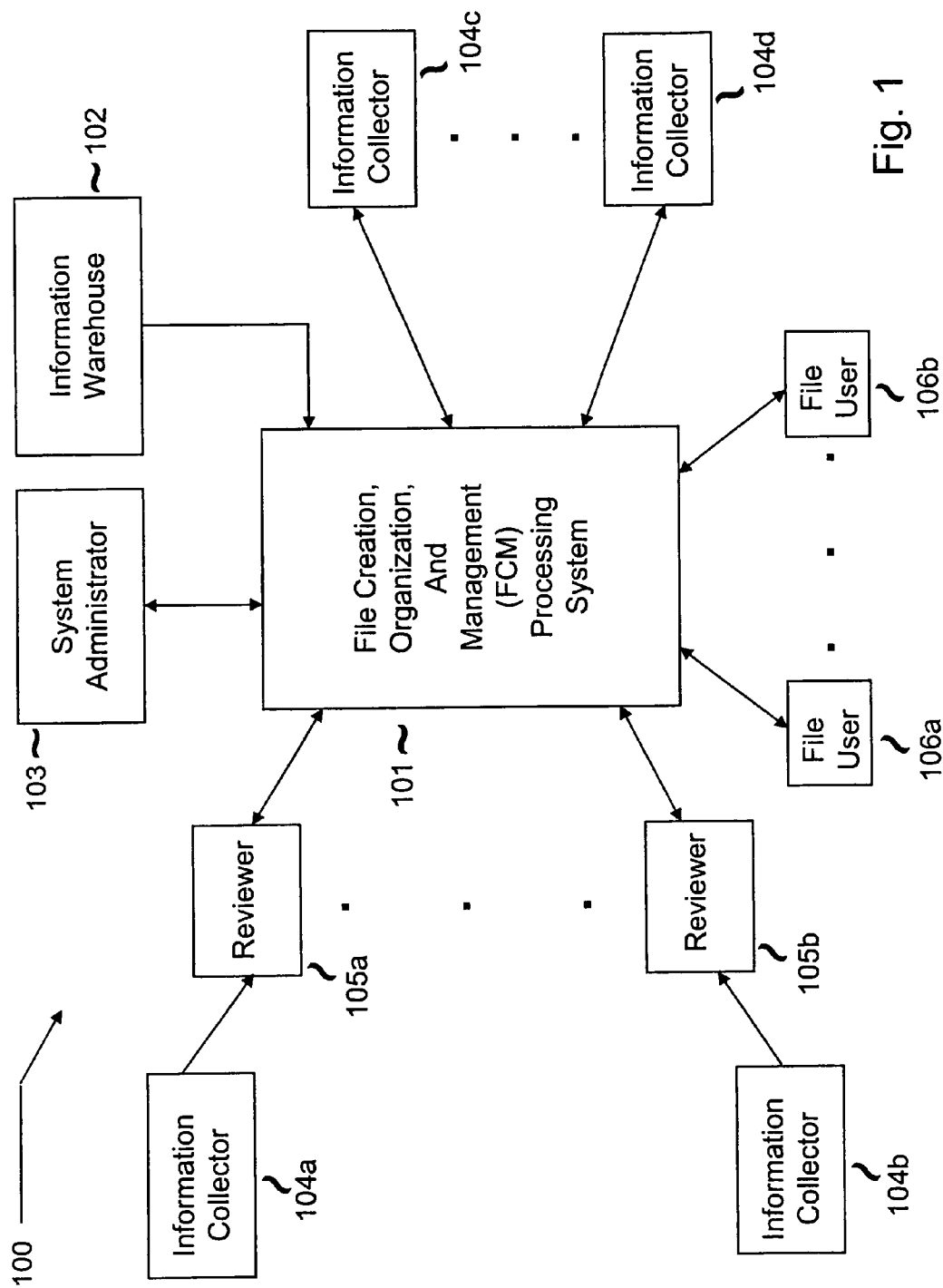
FIG. 1 is a high level block diagram of a representative file management system embodying the principles of the present invention.
Figure 2:
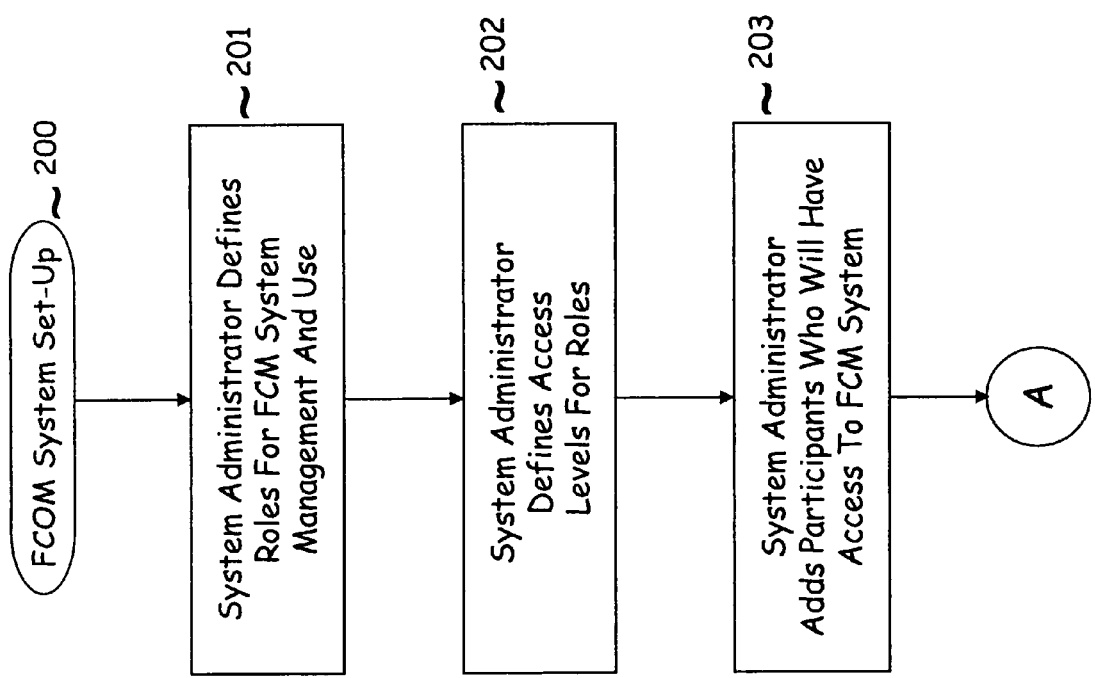
FIG. 2 is a flow chart illustrating a preferred set-up procedure for configuring the representative file management system of FIG. 1.
Figure 2:
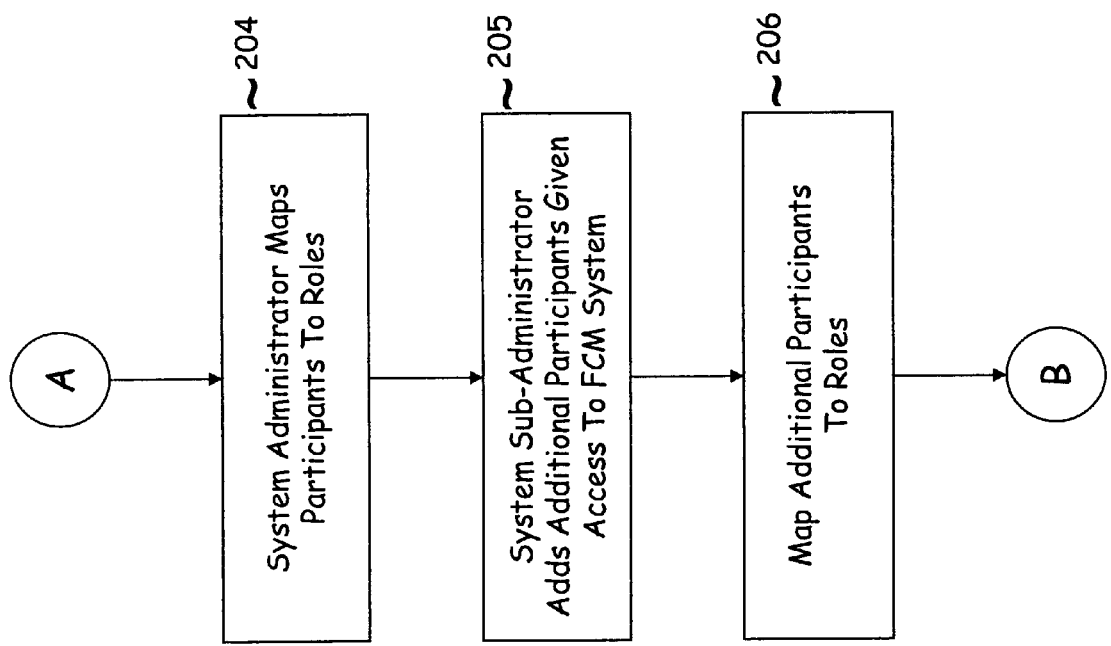
Figure 2:
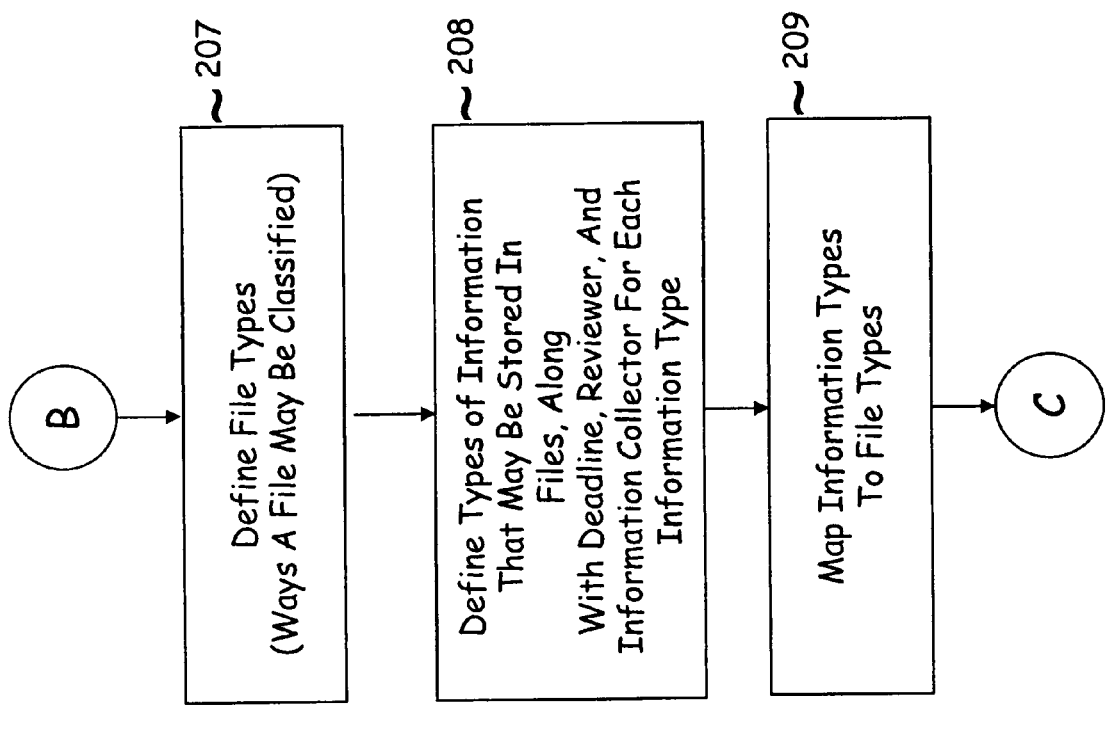
Figure 2:
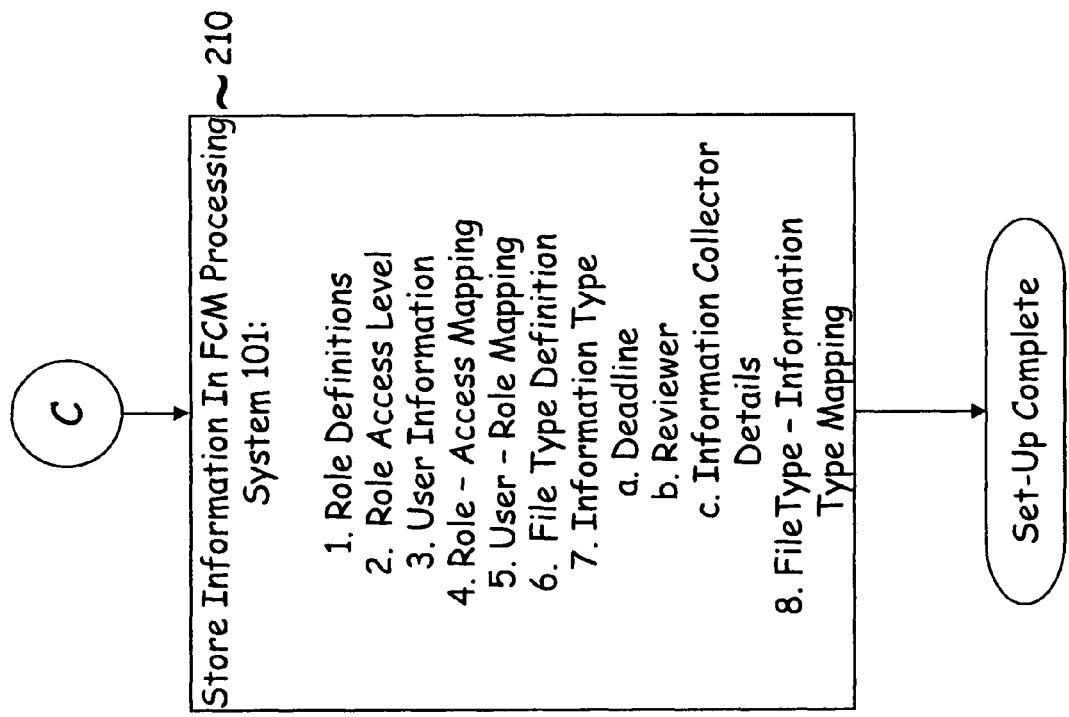
Figure 3:
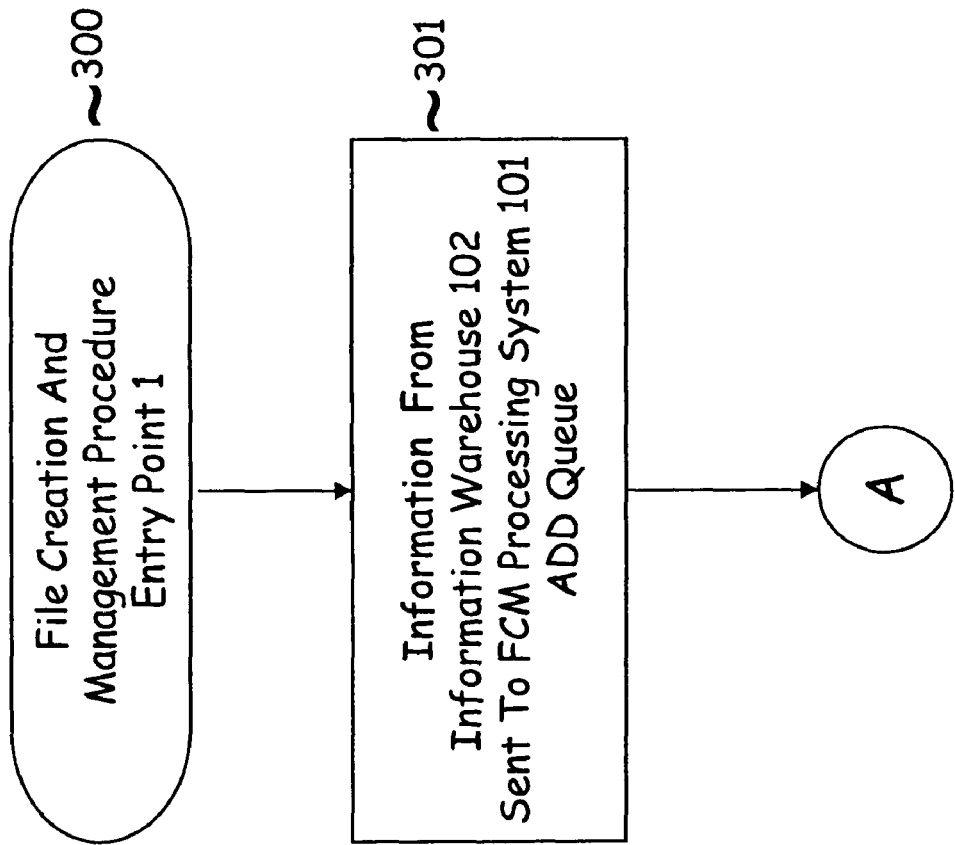
FIG. 3 is a flow chart of an exemplary electronic file creation and management procedure, suitable for implementation on the file management system of FIG. 1 according to one embodiment of the principles of the present invention.
Figure 3:
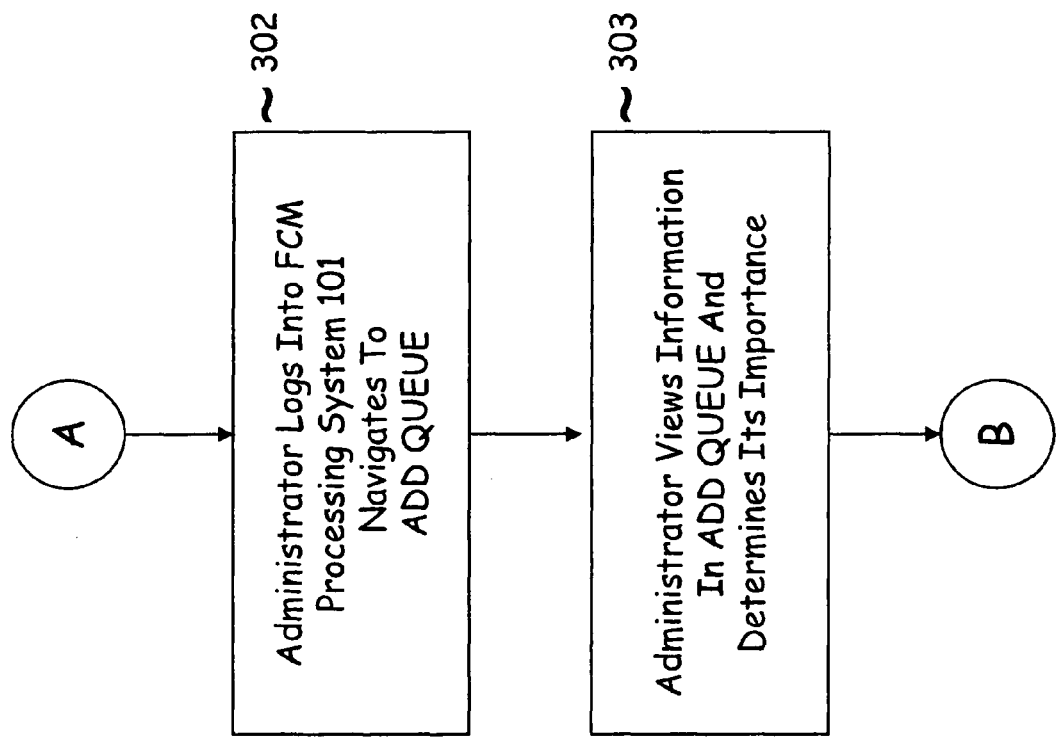
Figure 3:
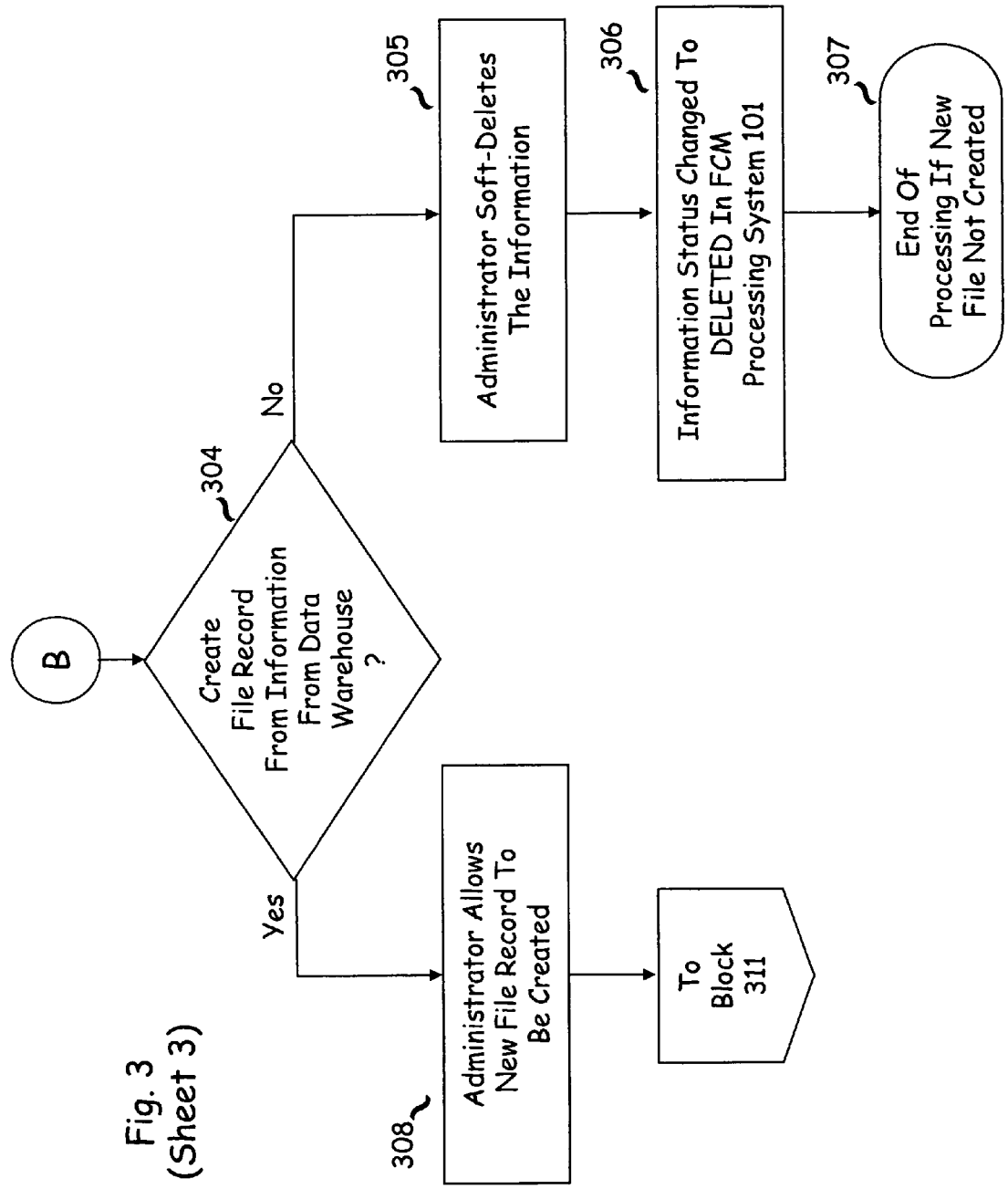
Figure 3:
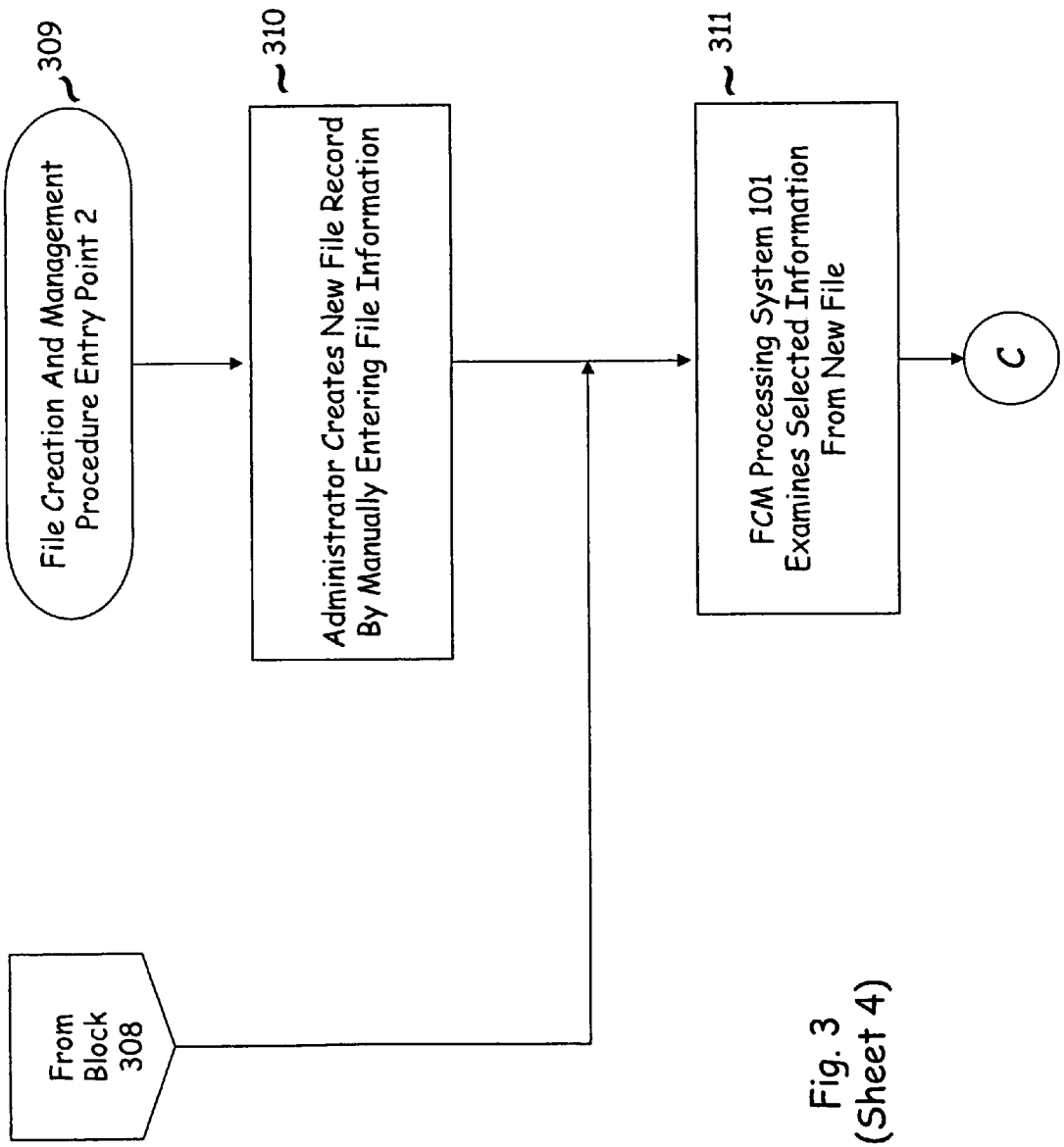
Figure 3:
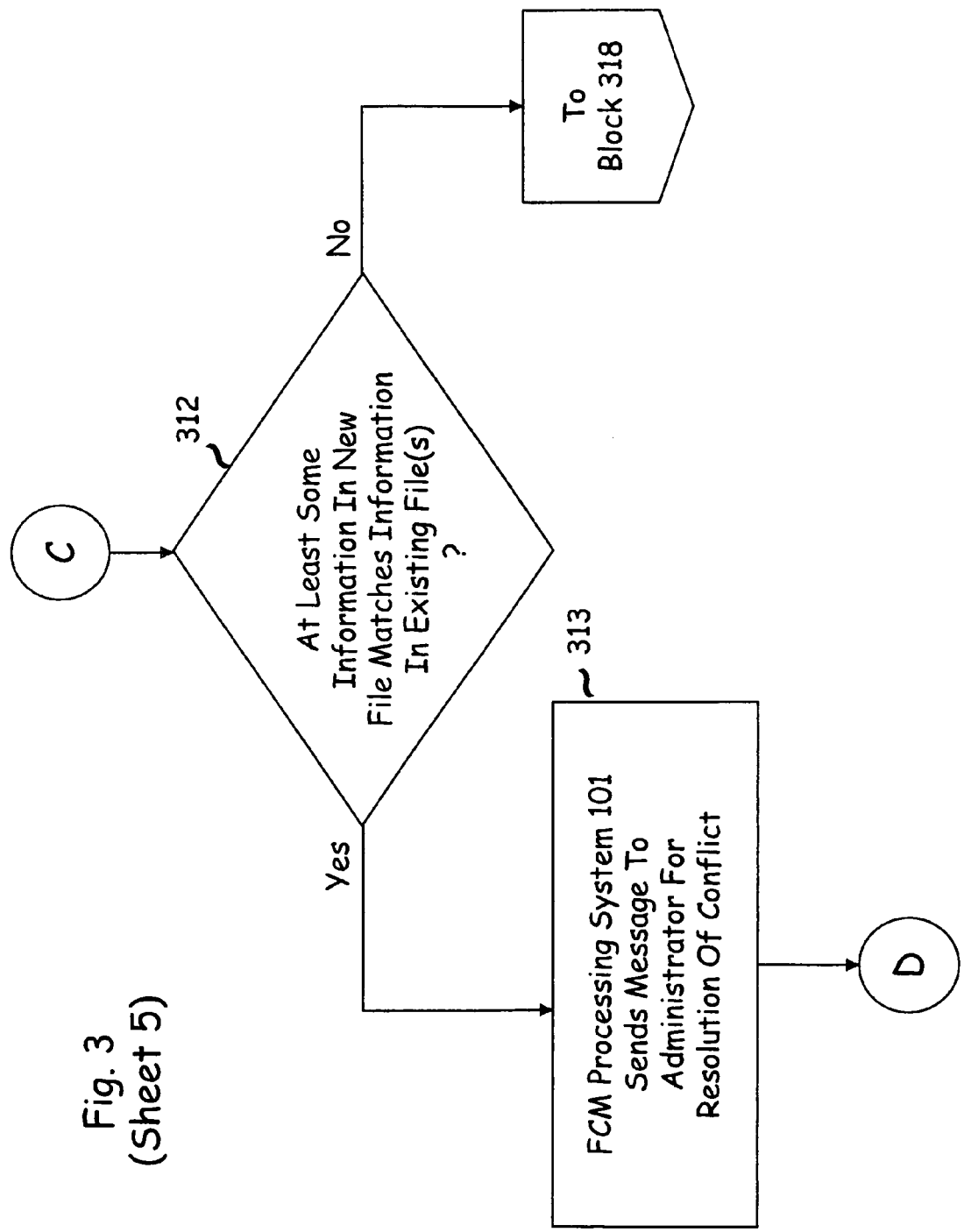
Figure 3:
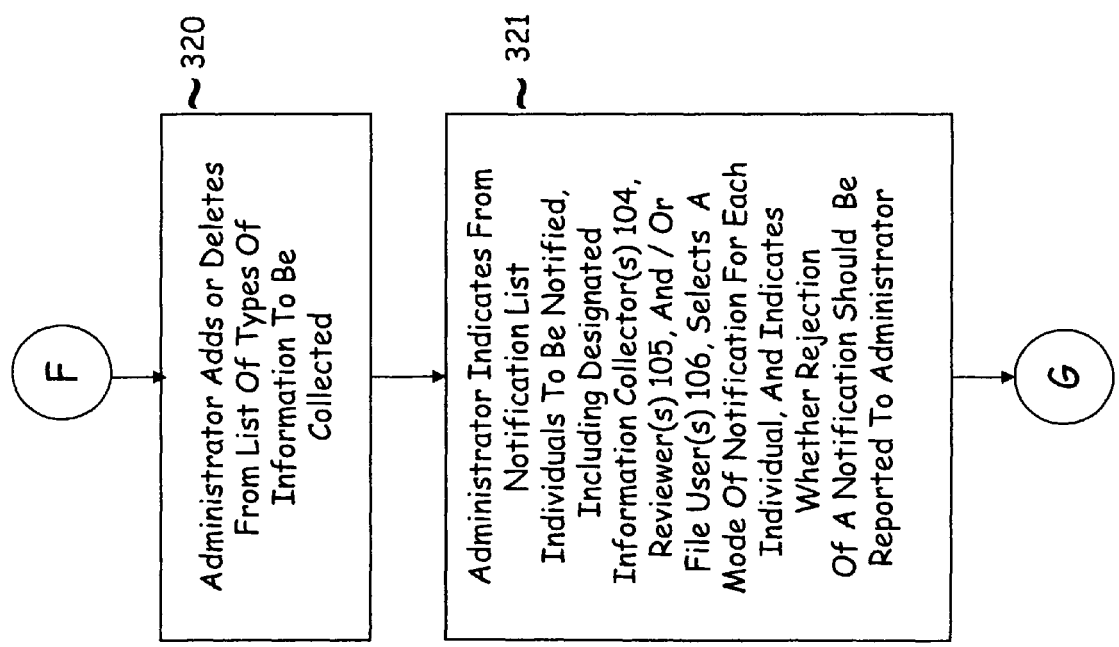
Figure 3:
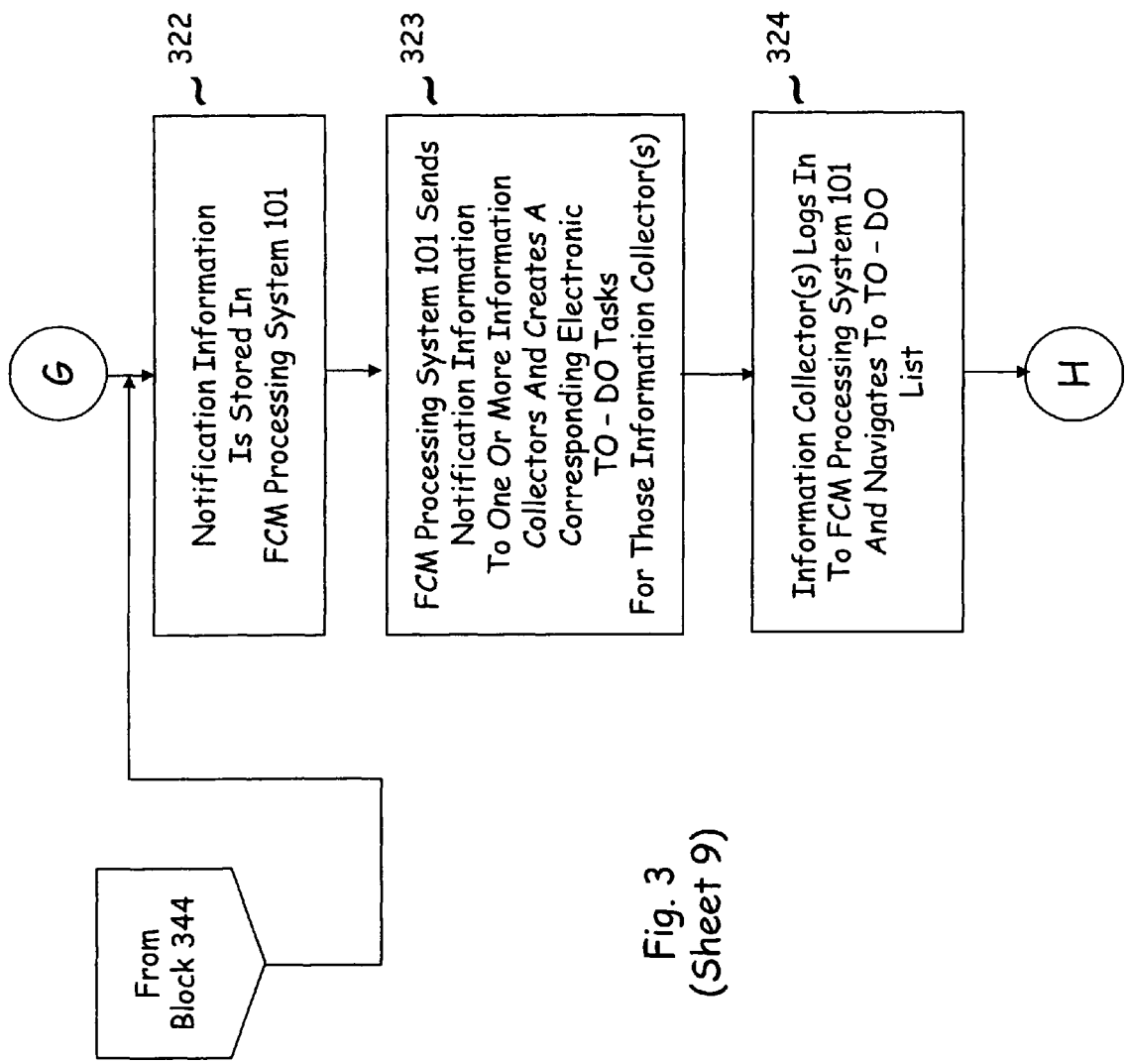
Figure 3:
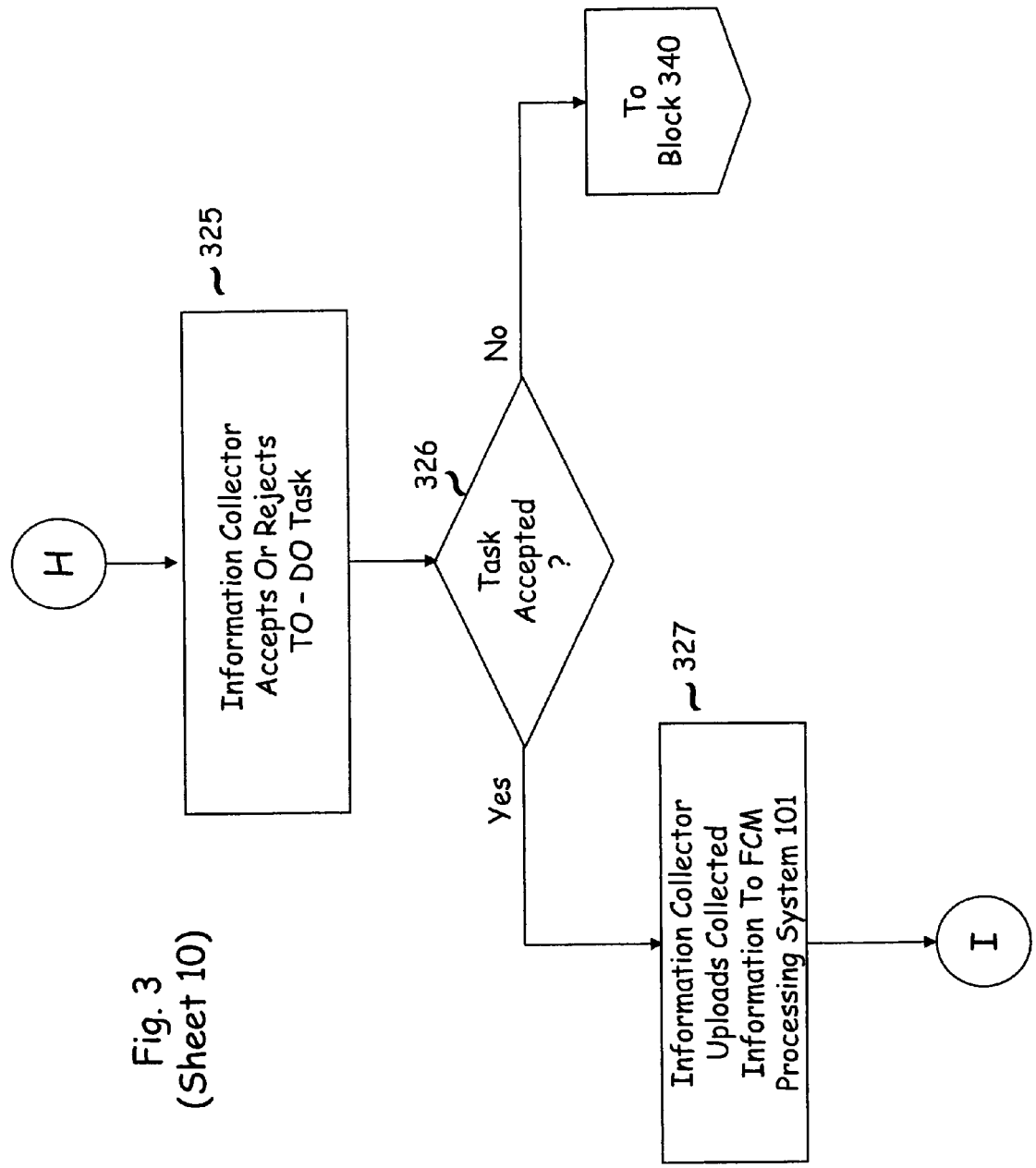
Figure 3:
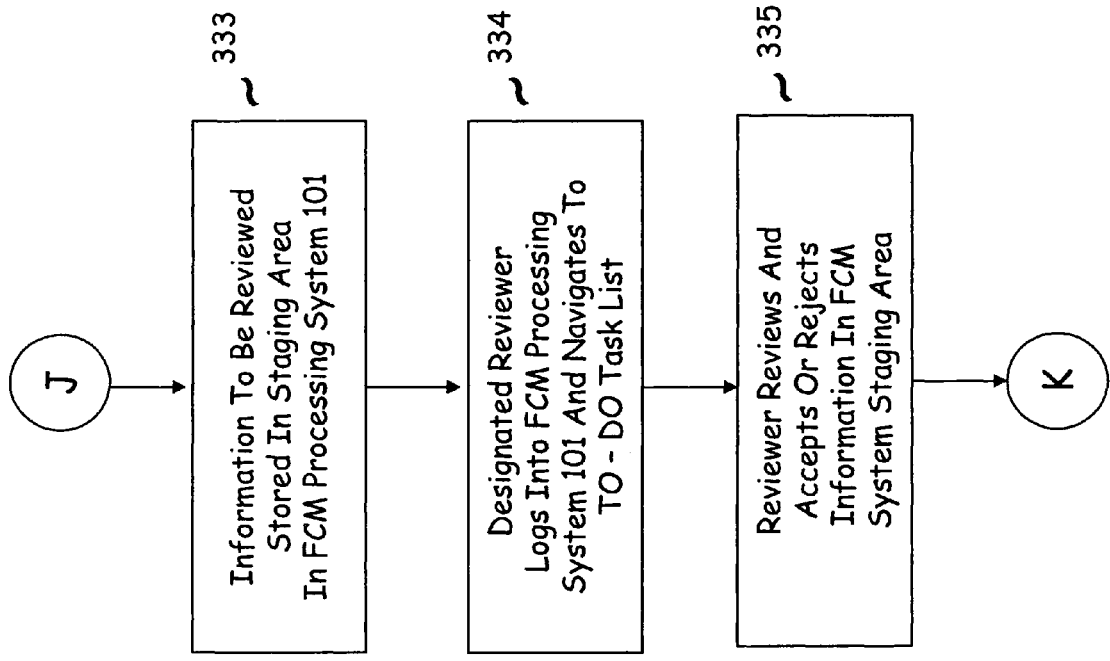
Figure 3:
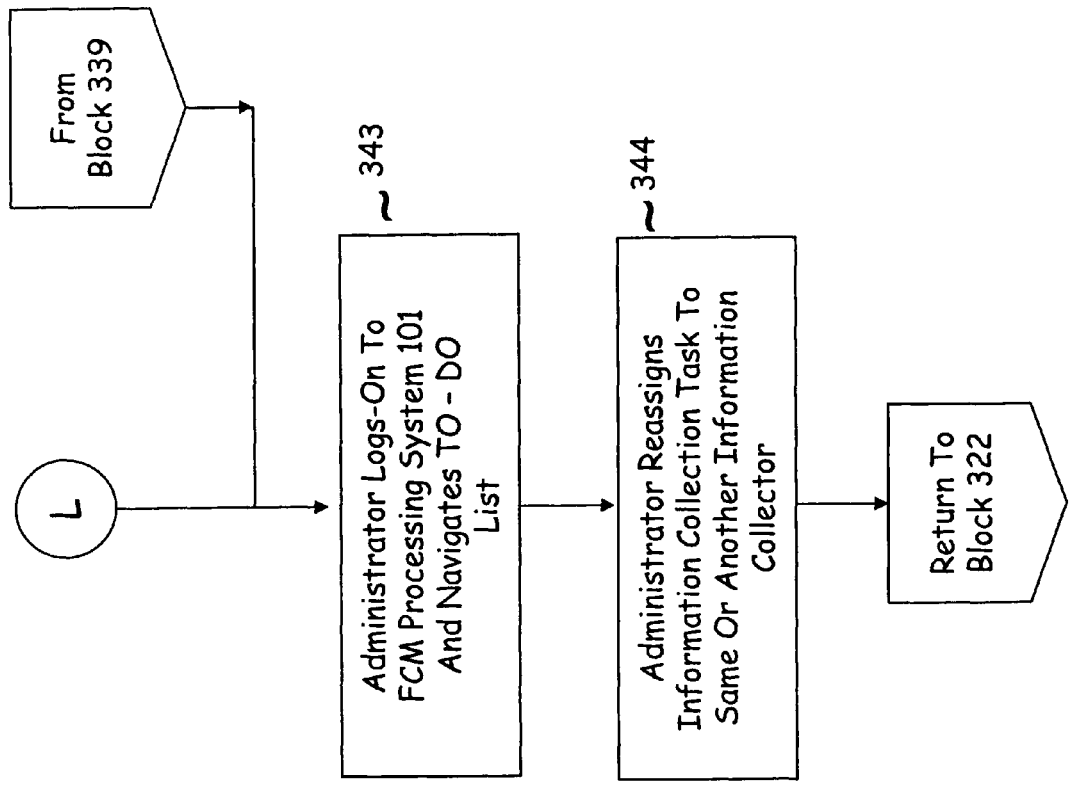
Figure 3:
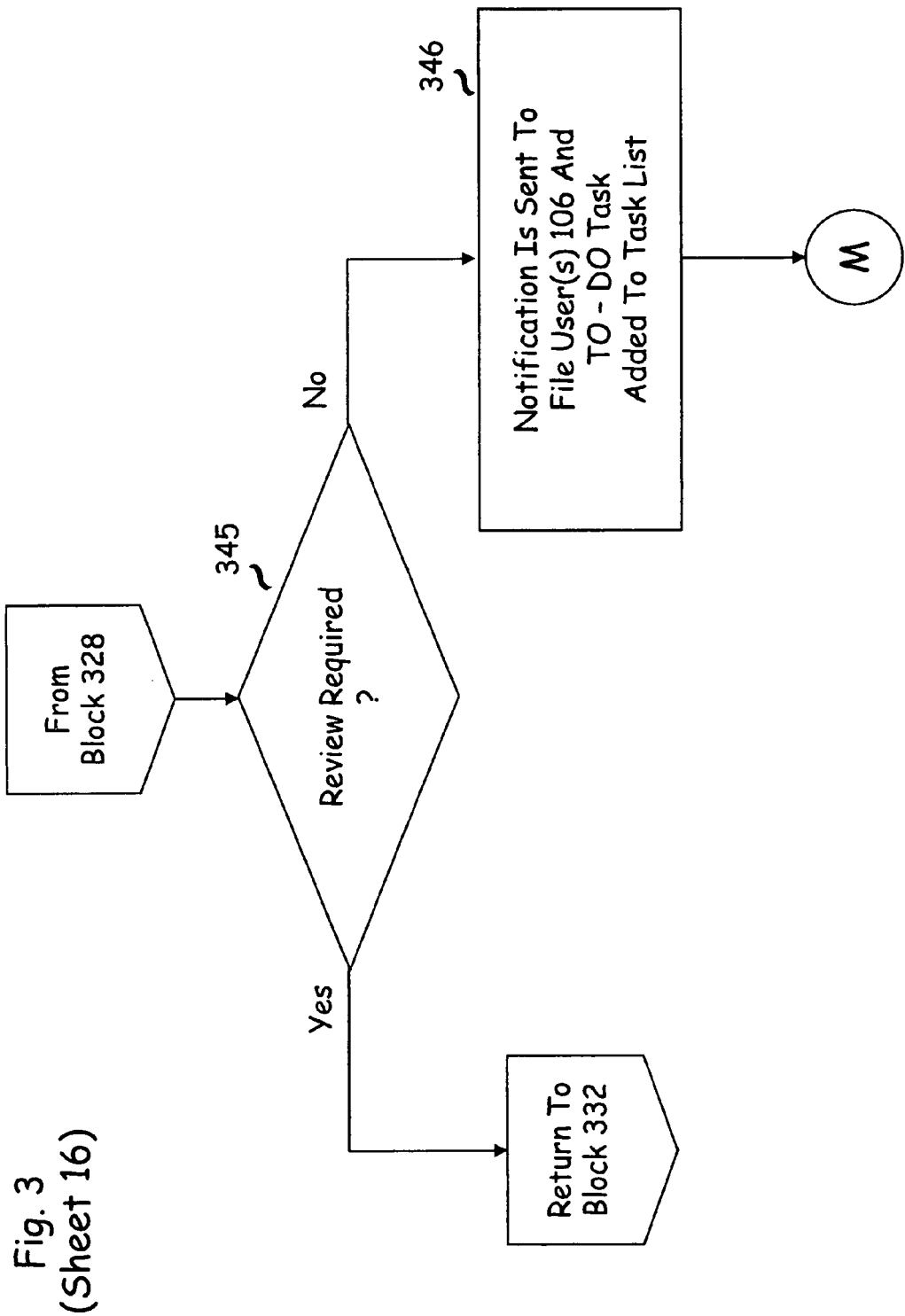

The principles of the present invention and their advantages are best understood by referring to the illustrated embodiment depicted in FIGS. 1-3 of the drawings, in which like numbers designate like parts.

FIG. 1 is a high level block diagram of a file creation, organization, and maintenance (FCOM) system 100 embodying the principles of the present invention. FCOM system 100 is suitable for use in a wide range of applications in which multiple actors work in concert in the timely creation and maintenance of electronic files that contain accurate, secure, and well organized information. For example, an insurance company might apply FCOM system 100 for generating and maintaining claims files, a law firm might apply FCOM system 100 for handling case files, or a human resources department might apply FCOM system 100 for maintaining employee files. There are numerous other examples. Advantageously, depending on the electronic communications systems employed, FCOM 100 allows for personnel to operate from locations that are widely distributed over large or very large geographical areas.

FCOM system 100 is based on a file creation, organization, and management (FCM) processing system 100, which may be a network of servers, one or more mainframe computers, or a network of personal computers, including database hardware and software. The actual size and configuration of FCM processing system 100, as well as the software operating and database systems used, will depend on user-driven factors, including the size of the user's enterprise, the amount, and type of information that must be managed, and similar constraints. Generally, application of the principles of the present invention does not depending on the specific hardware and operating system used.

FCM processing system 101 operates in conjunction with an electronic data warehouse 102, which maintains the electronic information used to initiate a file, for example the name and address of a client, customer, or insured, the type of controversy or transaction, and so on. As with FCM processing system 101, electronic data warehouse 102 is established and maintained using conventional hardware and software.

Overall control of FCOM system 100 rests with the system administrator 103, who may in turn delegate authority to one or more sub-administrators. As discussed further below, system administrator 103 defines the roles of each participant in the process of creating, organizing, and managing electronic files, including information collectors 104, reviewers 105, and file users 106, each of which interfaces with FCOM system 100 through an electronic terminal such as a personal computer or the like. System administrator 103 also controls the level of access a given participant has to given files stored within FCM processing system 101.

Four information collectors 104a-104d are shown in FIG. 1 for reference; in actual embodiments of FCOM system 100, the number of information collectors 104 will vary, depending on the requirements of the user. The primary focus of an information collector 104, as tasked by the role defined by system administrator 103, is to collect and upload information into FCM processing system 101 through the information collector's electronic terminal for a given electronic file. Examples of a information collector 104 in particular embodiments include private investigators, consultants, or experts working for a law firm, and insurance adjustors employed by insurance companies.

The information being uploaded can be in any form that can be suitably digitized, and includes text, audio, and video. The original itself can be digital (e.g. the output of a digital camera, digital audio decoder, computer, or electronic monitoring device), analog, or in hard-form (e.g. hard-copies of text and photographs). Actual upload to FCM system 100 may be directly from the information collector's terminal via a network (e.g. to a private or public network), though hard media (e.g. a CDROM), or through an auxiliary device such as a scanner or other data digitizer.

As specified by system administrator 103, information uploaded by a given information collector 104 may be reviewed for suitability and accuracy by an online reviewer, such as reviewers 105a-105b. A reviewer 105 may be for example, a person dedicated to quality control, another information collector, a system administrator, or any other personnel assigned the role by system administrator 103. For example, in a law firm environment, reviewer 104 may be a paralegal, clerk, consultant, expert, or attorney tasked with reviewing the uploaded information for accuracy, completeness, and materiality.

A file user 106a-106b is able to access a given electronic file stored within FCM processing system 101, as allowed by the access permissions granted by administrator 103. A file user 106 may be, for example, a decision maker, such as an attorney or an insurance claims representative, or any other authorized person requiring access to the stored information to complete an assigned task.

It should be noted that, depending on the roles defined by administrator 103, reviewers 104 and file users 105 may also upload information into a given electronic file, depending on the role definition and/or access level assigned by system administrator 103. Similarly, information collectors 104 and reviewers 105 may also be granted subsequent access to a given file, depending on the role definition. In other words, it is the definition of roles by the administrator 103 that controls the level of participation and authorization of each actor. Moreover, the defined roles are not limited to the information collectors, reviewers, and file users described above. For example, through the roles set-up by the administrator, "eFileClerks" can be assigned to file and pull information from the files and sub-files in an electronic file room of categorized electronic files in a very efficient manner.

FIG. 2 is a flow chart of a Procedure 200 for setting up FCOM system 100 according to the principles of the present invention. In particular, Procedure 200 begins with Blocks 201 and 202 where administrator 103 defines roles in the FCM processing system 101 for management and use of given electronic files and then defines access levels to those roles. Administrator 103 may, at any time, add participants (i.e. information collectors, reviewers, and file users) who will have access to the system at Block 203. At Block 204, system administrator 103 maps all the entered participants to their roles.

As discussed above, administrator 103 can delegate tasks to a sub-administrator, as appropriate. At Block 205, the sub-administrator adds additional participants given access to system 100. Those additional participants are mapped to corresponding roles at Block 206.

At Block 207, administrator 103 (or sub-administrator, as appropriate) defines file types (i.e. the ways files can be classified). For example, for a law firm, files might be categorized as litigation (controversy) files or transactional files. An insurance company may categorize a file by claim type (e.g. automobile, home, or business).

Next, at Block 208, the administrator (sub-administrator) defines the types of information that may be stored in a given type of file, as well as adds deadline information, along with reviewer and information collector details, for each information type. In the law firm example, litigation information might include pleadings and evidence, while transactional information might include contracts, closing documents, and the like. The designated collector or reviewer might be a clerk, paralegal, attorney, or consultant. The defined types of information that may be stored in a given-type of file perform essentially the same function as sub-folders or tabs in conventional hard-copy filing systems. Advantageously, these electronic sub-files allow collected information to be efficiently filed after the uploading process described below, and then subsequently accessed by those participants having the appropriate access authority.

At Block 209, the information and file types are mapped within FCM processing system 101 such that information required for a given type of file will be collected. At Block 210, the FCM processing system 101 database is populated with information including, but not limited to, role definitions, role access levels, user information, user-role mappings, information types (e.g. deadline, reviewer, and information collector details), and file type-information type mappings.

FIG. 3 is a flow chart of a file creation and management (FCM) procedure 300 embodying the principles of the present invention. As discussed below, the illustrated embodiment of procedure 300 includes two (2) entry points. Starting at the first entry point, information is retrieved at Block 301 from information warehouse 102 and sent to the ADD Queue within FCM processing system 101. This information may include, for example, the name and address of the client or customer, the type of transaction or controversy, and/or the time, date, and location of a triggering event.

At Block 302, administrator 103 (or designated sub-administrator) logs on to FCM processing system 101 and navigates to the ADD Queue. The administrator 103 can then view the information present in the ADD Queue and determine its importance (Block 303). Administrator 103 then makes a decision (Decision Block 304) as to whether the information retrieved from data warehouse 102 requires opening a new file record. Generally, the file record acts as a header identifying the file and "behind" which collected information will be collected and organized.

If the particular information does not require opening a new file record, then administrator 103 exercises a soft delete feature (Block 305), which then changes the status of the information within FCM processing system 101 to DELETED (Block 306). Processing ends at Block 307 if a new file record is not created. Otherwise, at Block 308, administrator 103 allows a new file record to be created.

At an alternate entry point into Procedure 300 at Terminal Block 309, administrator 103 manually enters (at Block 310) the information required to create a new file record.

At Block 311, FCM system 101 attempts to match at least some of the defining information associated with the corresponding new file (e.g. either the file record or any information already available and associated with the file record) with file record information associated with an existing file. The case of a match occurring at Decision Block 312 will be considered first.

In this case, the FCM processing system 101 reports the conflict between records to the administrator 103 at Block 313. In response, administrator 103 is provided a number of options at Block 314 for resolving the conflict. For example, administrator 103 may either merge the conflicting file records to create a single record or simply purge one of the conflicting file records. Alternatively, administrator 103 may make one file record a parent record and the other file record a child record. Finally, administrator can treat the conflicting file records as being associated with completely different files.

If either of the file records is rejected at Decision Block 315, the status of the file record is changed to DELTED within the FCM processing system 101 (Block 316) and processing of the current file record is completed as Terminal Block 317.

On the other hand, for each file record which is accepted at Decision Block 315, a new file is initiated and the corresponding notification information is pulled up from the FCM processing system 101 at Block 318. Administrator 103 may accept or override the notification information, including the individuals to be notified, the timelines for notification, the location of the information to be collected, the criticality of the file and the review requirements, and the reviewers (Block 319).

Returning to Decision Block 312, if no match occurs between two file records, (i.e. no conflict exists) then Procedure 300 jumps directly to Block 318 for pull up of the applicable notification information.

At Block 320, administrator 103 adds or deletes, as necessary, the listed types of information to be collected for the given file. Next, at Block 321, administrator 103 determines the personnel to be notified with regards to the information that must be collected for the current file, as well as the mode of notification. For example, administrator 103 can designate the information collector(s) 104, reviewer(s) 105, file user(s) 106, the mode of notification (e.g. email, pagers, or both), as well as whether the rejection of a notification should be reported to administrator 103. This information is then stored in FCM processing system 101 at Block 322.

At Block 323, the FCM processing system 101 sends the appropriate notification to one or more information collectors 104, and creates an electronic To Do tasks for those information collector(s) to perform. A given information collector 104 logs into FCM processing system 101 and navigates to his or her To Do list (Block 324). For an assigned To Do task, the information collector 104 is provided with the option or accepting or rejecting the task (Block 325). In response to the acceptance or rejection of the given To Do task, Procedure 300 branches at Decision Block 326.

The case where the information collector 104 accepts a To Do task at Decision Block 326 will be considered first. In this case, at Block 327, the information collector 104 collects the information requested by the notification and uploads that information into FCM processing system 101. At Block 328, a determination is made as to whether the information collector 104 has been authorized access within to FCM processing system 101, as defined by the role.

If the Information collector user does have access to FCM processing system 101, then at Block 329, a determination is made as to whether review of the uploaded data is required. If verification is not required at Block 329, then the collected information is stored in the appropriate file in database of FCM system 101 and categorized by the specific corresponding information type (Block 330). The information in the electronic file is then accessible at Terminal Block 331, as defined by the roles.

On the other hand, if at Decision Block 329 the determination is made that review is necessary, then at Block 332 notification is sent to the assigned reviewer 105 and To Do task is added for that reviewer in FCM processing system 101. At Block 333, the information to be reviewed is stored in a staging area in FCM processing system 101. Subsequently, at Block 334, the reviewer logs into the FCM processing system 101 and navigate to his or her TO DO task list. The reviewer 105 can then, at Block 335, approve or reject the uploaded information in the staging area.

FCM processing system 101 determines at Decision Block 336 whether the reviewer 104 has accepted or rejected the uploaded information. If the information is accepted, then the collected information is stored in the appropriate file in database of FCM system 101 and categorized by the specific corresponding information type (Block 337). The information in the electronic file is then accessible at Terminal Block 338, as defined by the roles.

If, at Decision Block 336, the information is not accepted by the reviewer, then at Block 339, FCM processing system 101 sends a rejection notification to the information collector 104, marks the collected information as rejected, and notifies administrator 103 to add a task for the recollection of that information. Procedure 300 jumps to Block 343, discussed below.

Returning to Decision Block 326, for the case where the information collector rejects a To Do task, FCM processing system 101 makes a determination at Decision Block 340 as to whether the information requiring collection is critical. If the information is not critical, then at Block 342, FCM processing system 101 sends notifications to administrator 103, a supervisor, and the file user(s) 106, and adds a TO DO task requesting reassignment of the collection task to another information collector 104. However, if the information is critical, then at Block 341 an urgent notification (e.g. email or page) is sent to administrator 103, file user(s) 106, or a supervisor, as predefined at Block 209 or Block 319.

Administrator 103 logs on at Block 343, and navigates to the administrator to do task list. Administrator 103 then reassigns the information collection task to the same or another information collector 104 at Block 344 and then Procedure 300 jumps back to Block 322 and the appropriate notifications and task assignments are reinitiated.

Returning to Decision Block 328, assume that the information collector does not have access to the FCM processing system 101. As was done before, a decision is first made at Block 345 as to whether review of the data is required. If review is required, then Procedure 300 loops-back to Block 332, and continues from there. Otherwise, at Block 346, a notification is sent to the file user(s) 106 and to the TO DO task list for the file user(s).

The file user(s) 106 logs on to FCM processing system 101 at Block 347, navigates to the TO DO list, and reviews the information in the electronic file. The file user(s) 106 approves or rejects the information at Decision Block 348.

If the information is accepted, Procedure 300 returns to Block 337, where the information is categorized, filed, and ready for review. Otherwise, if the information is rejected, then Procedure 300 returns again to Block 339, where the process of recollecting the information is initiated, as discussed above.

The embodiments of the principles of the present invention realize substantial advantages over the prior art. Among other things, an electronic file can be created for a given purpose and the appropriate information collected by the appropriate personnel, regardless of geographic location. The collected information can then be organized within the file by information type, for efficient access. The inventive principles also provide for the review of uploaded information, such that information that does not meet the requirements of the information users can promptly be recollected. Additionally, automatic notification systems are provided to insure that information required for a given file, particularly time-critical information, is collected and uploaded to the electronic file in a timely manner.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed:

1. A method of file management in an electronic processing system comprising:
   defining in the electronic system an electronic file of a selected file type and at least one electronic sub-folder within the electronic file for storing information of a corresponding information type, including:
      receiving file record information from an administrator to set up the electronic file and the at least one electronic sub-folder;
      comparing in the electronic system at least some of the received file record information with information previously stored in the electronic system;
      when a match occurs between the at least some of the received file record information and the information previously stored, reporting conflicting file records to the administrator; and
      allowing the administrator to selectively combine conflicting file records to create a single file record, selectively purge a conflicting file record, selectively make a first conflicting file record a parent and a second conflicting file record a child file record, and selectively associate conflicting file records with different files;
   defining roles in the electronic processing system for participants creating and utilizing the electronic file, including a role for at least one participant as an information collector, including defining a role for a reviewer;
   electronically tasking the information collector to collect information of the information type;
   selectively uploading the selected information from the information collector and selectively storing the uploaded information in the sub-folder in the electronic file, including:
      electronically tasking the reviewer to review and selectively accept the uploaded information prior to storage in the sub-folder;
      receiving an electronic rejection of the uploaded information from the reviewer; and
      electronically tasking a selected participant to recollect the selected information; and
   allowing selected ones of the participants to access the electronic file as defined by the corresponding roles.

2. The method of claim 1, wherein defining roles comprises defining a role for a file user and the method further comprises electronically tasking the file user to review and selectively accept the uploaded information prior to storage in the sub-folder.

3. The method of claim 1, wherein electronically tasking the information collector and selectively uploading the selected information comprise:
   sending an electronic assignment to the information collector to collect the selected information;
   receiving an electronic assignment acceptance from the information collector in response to the electronic assignment and uploading the selected information from the information collector.

4. The method of claim 1, wherein defining roles in the electronic processing system for participants is performed by a system administrator and further comprises:
   defining access levels corresponding to the roles in response to administration input;
   selecting the participants in response to administration input;
   mapping in the electronic system the selected participants to the roles.

5. The method of claim 4, wherein the defined roles are selected from the group consisting of file users, reviewers, and information collectors.

6. A method of file management in an electronic processing system comprising:
   defining in the electronic system an electronic file of a selected file type and at least one electronic sub-folder within the electronic file for storing information of a corresponding information type, including:
      setting up the electronic file by selectively inputting file record information into the electronic system and allowing an administrator to selectively create the electronic file within the electronic system based on the contents of the file record information;
      comparing with the electronic system the input file record information with existing file record information stored within the electronic system; and
      when a match occurs between the input file record information and the existing file record information, selectively allowing the administrator to reconcile the input file record information and the existing file record information, including allowing the administrator to selectively combine conflicting file records to create a single file record, selectively purge a conflicting file record, selectively make a first conflicting file record a parent and a second conflicting file record a child file record, and selectively associate conflicting file records with different files;
   defining roles in the electronic processing system for participants creating and utilizing the electronic file, including a role for at least one participant as an information collector;
   electronically tasking the information collector to collect information of the information type;

selectively uploading the selected information from the information collector and selectively storing the uploaded information in the sub-folder in the electronic file; and allowing selected ones of the participants to access the electronic file as defined by the corresponding roles.

7. An electronic file management system comprising:

a plurality of terminals for interfacing with a plurality of participants utilizing the file management system;

a processing system communicating with the terminals for storing and managing electronic files, wherein each file is categorized by a selected file type and includes at least one electronic sub-folder for storing information of a corresponding information type, the processing system operable to:

allow an administrator to define an electronic file of the selected file type including:

receive file record information from the administrator to set up the electronic file and the at least one electronic sub-folder;

compare in the electronic system at least some of the received file record information with information previously stored in the electronic system;

when a match occurs between the at least some of the received file record information and the information previously stored, reporting conflicting file records to the administrator; and allow the administrator to selectively combine conflicting file records to create a single file record, selectively purge a conflicting file record, selectively make a first conflicting file record a parent and a second conflicting file record a child file record, and selectively associate conflicting file records with different files;

in response to input from the administrator, set-up roles for the participants including a role for at least one information collector;

in response to input from the administrator, electronically task the information collector to collect information of a select information type for a selected electronic file;

selectively upload of the selected information from the information collector;

selectively store the uploaded information in a sub-folder corresponding to the selected information type in the selected electronic file;

control access by selected ones of the participants to the selected electronic file as defined by the corresponding roles;

receive an electronic rejection of the uploaded information from a reviewer;

electronically notify the administrator of the rejection of the uploaded information; and in response to input from the administrator, electronically task a selected participant to recollect the selected information.

8. The electronic file management system of claim 7, wherein the processing system tasks the information collector by entering task on an electronic to-do list accessible through the terminal associated with the information collector.

9. The electronic file management system of claim 7, wherein the processing system sets-up a role for a reviewer in response to input from the administrator and is further operable to:

in response to input from the administrator, electronically task the reviewer to review the uploaded information;

allow the reviewer to selectively access the electronic file through a corresponding one of the terminals; and allow the reviewer to selectively accept the uploaded information prior to storage in the sub-folder of the selected electronic file.

10. The electronic file management system of claim 9, wherein the processing system tasks the reviewer by entering an entry on an electronic to-do list accessible through the terminal associated with the reviewer.

11. The electronic file management system of claim 7, wherein the processing system sets-up role for a file user in response input from the administrator and is further operable to:

in response to input from the administrator, electronically task the file user to review the uploaded information;

allow the file user to selectively access the electronic file through a corresponding one of the terminals; and allow the file user to selectively accept the uploaded information prior to storage in the sub-folder of the electronic file.

12. An electronic file management system comprising:

a plurality of terminals for interfacing with a plurality of participants utilizing the file management system;

a processing system communicating with the terminals for storing and managing electronic files, wherein each file is categorized by a selected file type and includes at least one electronic sub-folder for storing information of a corresponding information type, the processing system operable to:

in response to input from an administrator, set-up roles for the participants including a role for at least one information collector;

in response to input from the administrator, electronically task the information collector to collect information of a select information type for a selected electronic file;

selectively input file record information;

allow the administrator to selectively create the electronic file within the electronic system based on the contents of the file record information;

compare the input file record information with existing file record information stored within the electronic system; and when a match occurs between the input file record information and the existing file record information, selectively allow the administrator to reconcile the input file conflicting file records to create a single file record, selectively purging a conflicting file record, selectively making a first conflicting file record a parent and a second conflicting file record a child file record, and selectively associating conflicting file records with different files;

selectively upload of the selected information from the information collector;

selectively store the uploaded information in a sub-folder corresponding to the selected information type in the selected electronic file; and control access by selected ones of the participants to the selected electronic file as defined by the corresponding roles.

13. The electronic file management system of claim 12, wherein the processing system inputs file record information from an electronic information warehouse.

* * * * *